INVENTORS
CLIFFORD BURDIN
JAMES D. CLARKE
JAMES D. GEHRIS
JOHNNIE L. WHITTAKER

BY Robert O. Richardson
—ATTORNEY—

United States Patent Office 3,518,016
Patented June 30, 1970

3,518,016
GYROSCOPICALLY CONTROLLED IMAGE STABILIZATION SYSTEM
Clifford Burdin, Van Nuys, James D. Clarke, Encino, James D. Gehris, Palos Verdes, and Johnnie L. Whittaker, Granada Hills, Calif., assignors, by mesne assignments, to McDonnell Douglas Corporation, Santa Monica, Calif., a corporation of Maryland
Filed May 6, 1966, Ser. No. 548,307
Int. Cl. G01c 9/02, 17/34
U.S. Cl. 356—248                      1 Claim

ABSTRACT OF THE DISCLOSURE

A gyroscopically controlled image stabilization system for stabilizing and maintaining a fixed line of sight of an optical instrument on a movable base.

BACKGROUND OF THE INVENTION

Whenever a scene is being viewed, whether directly with the eyes or with the aid of an optical instrument, if there is relative motion between the scene and the observer, some correction must be made to keep the scene centered on the retina. For direct viewing this correction is made instinctively and automatically by motion of the body, head, and eyes of the observer. When an optical instrument is used, the observer can still make the necessary corrections by moving the instrument, but now the correction is not a natural or instinctive reaction for it must be done by moving the instrument with the hands which played no part in the case of direct viewing correction. The result is that the correction is not as good and the image on the retina has unwanted motion and may even blur. The observer, trying to correct for rapid relative motion between himself and the scene, may introduce extraneous motion which further deteriorates the quality of the observation.

The same situation exists when the observation is not made directly by the observer, but involves an intermediate phase, such as when a camera (television or motion picture) is used to make pictures of the scene. While watching these pictures, any unwanted motion of the scene is annoying to the viewer and may become unbearable. It is evident then that a device that would automatically make the required corrections would be of benefit to the motion picture and television industries.

Another area where image stability is required is that of astronomical observation. In recent years there has been increasing interest in the use of high flying aircraft as a base from which to conduct astronomical experiments. This interest in airborne astronomy is stimulated by the mobility and improved "astronomical seeing" offered by a flying observatory. A flying observatory can be stationed at the most advantageous spot above the earth for observing astronomical events and, at an altitude of 40,000 feet, is above 85 percent of the earth's atmosphere and 99 percent of the atmosphere's water vapor.

Aircraft stability alone, as provided by an autopilot, is insufficient to meet the stringent requirements of many experiments. The object of one such experiment was to obtain four 100 second exposure spectrograms, covering the spectral range extending from the blue visible into the near ultraviolet, of a segment of the solar corona extending out some 2 solar radii from the solar limb. Image stability of one arc minute RMS over each of the 100 second exposure times was required for this experiment to be considered successful.

Prior to the present time the method for pointing optical instruments that must be mounted on a moving base consisted of mounting the instrument on a gimbal and aiming the instrument either by manual or remote control. A gimbal is herein defined as a mechanical frame containing two mutually perpendicular intersecting axes of rotation. Rotation of the frame about the outer axis changes the position of the inner axis of rotation. The instrument mounted on a gimbal could be automatically aimed through use of gyros or optical sensors. The term gyro is synonymous with gyroscope which is herein defined as a device which utilizes the angular momentum of a spinning rotor to sense angular motion of its case about one or more axes orthogonal to the spin axis. These particular gyros may be defined as devices, which, when rotated about a specified axis, provide an electrical signal whose amplitude is proportional to the angle through which they are rotated (rate-integrating gyro) or is proportional to the angular rate at which they are rotated (rate gyro). The present invention permits the instrument to be rigidly mounted to the moving base, rather than mounted on a gimbal which is attached to the moving base. This permits the operator or observer free access to the instrument at all times, whereas the instrument mounted on the gimbal is in constant motion and must be operated "hands off." By moving a relatively small mirror instead of a large optical instrument, friction and mass unbalance problems are minimized. The mirror also provides more flexibility in view when the viewing must be done through a small optical window.

SUMMARY OF PRESENT INVENTION

The present invention provides a means for controlling the look direction of an optical instrument rigidly mounted on a moving base, such as a ship or airplane, so as to maintain a fixed look direction despite random motions of the base. This is achieved by mounting a small sighting mirror, rather than the whole optical instrument, on a gyro-controlled arrangement in front of the instrument optics, thus permitting the look direction to be maintained constant in space despite motion of the instrument with the moving base.

The apparatus utilizing the present invention attains pointing direction for the rigidly mounted optical instrument by aiming the optical instrument at the gimbal mounted mirror. By driving the gimbal, i.e., moving the mirror, the look direction of the instrument can be changed. Conversely, if the instrument base is moved (the base is also the support for the gimbal) thereby moving the instrument, the look direction can be held constant by moving the mirror. The gimbal has gyros mounted on its axes to sense any motion of the base (and therefore the instrument), and the stabilization system compensates for this motion.

It is therefore an object of this invention to provide for an improved image stabilization system.

Another object is the provision of a gyroscopically controlled image stabilization system for viewing an image from a moving base.

Another object is the provision of a stabilization system for maintaining a fixed look direction for an optical instrument subject to random motion.

Another object is the provision of a stabilization system for maintaining an image in a fixed look direction within an accuracy of less than one minute of arc.

Another object is the provision of an airborne heliostat having a controlled movable reflecting surface and an optical instrument fixedly positioned to receive the reflected image.

Other objects will become more apparent as a description of the invention proceeds, having reference to the drawings, wherein.

One embodiment utilizing the present invention is an airborne heliostat. The heliostat is herein defined as a mirror mounted on a gimbal which can be driven automatically and used to reflect a beam of sunlight in a given direction with reference to a specified coordinate system (that of the aircraft) as the sun appears to move about in the sky. The overall system, including the mirror mounted on the gimbal, the servo-motors which rotate the mirror about the gimbal axes, the gyros which sense motion about the gimbal axes, the electronics and controls which make possible the automatic or manual mode of operation, is called the heliostatic system. Heliostats are not new since ground-based heliostats have been used by astronomers for many years. Basically, the instrument designed for use on the ground consists of a mirror so mounted that it is rotatable about an axis that is aligned with the earth's rotational axis. By driving the mirror about this axis at a rate that is equal and opposite to that of the earth's rate, a beam of sunlight may be constantly reflected in a fixed direction on the earth. The heliostat shown in FIG. 1 for airborne astronomical observations differs considerably in operation from the ground-based heliostat, although the purpose of the two instruments is the same, i.e., to reflect a beam of light in a fixed direction, despite motions of the base to which the instrument is attached.

One difference is, of course, that on board an airplane the fixed direction must be relative to the aircraft which may have many intricate motions; whereas the ground-based heliostat's fixed direction is relative to the earth which can be considered to have but one motion. Equivalently, it can be said that the purpose of the airborne heliostat is to provide a space stabilized look direction from the aircraft.

Figure 1:
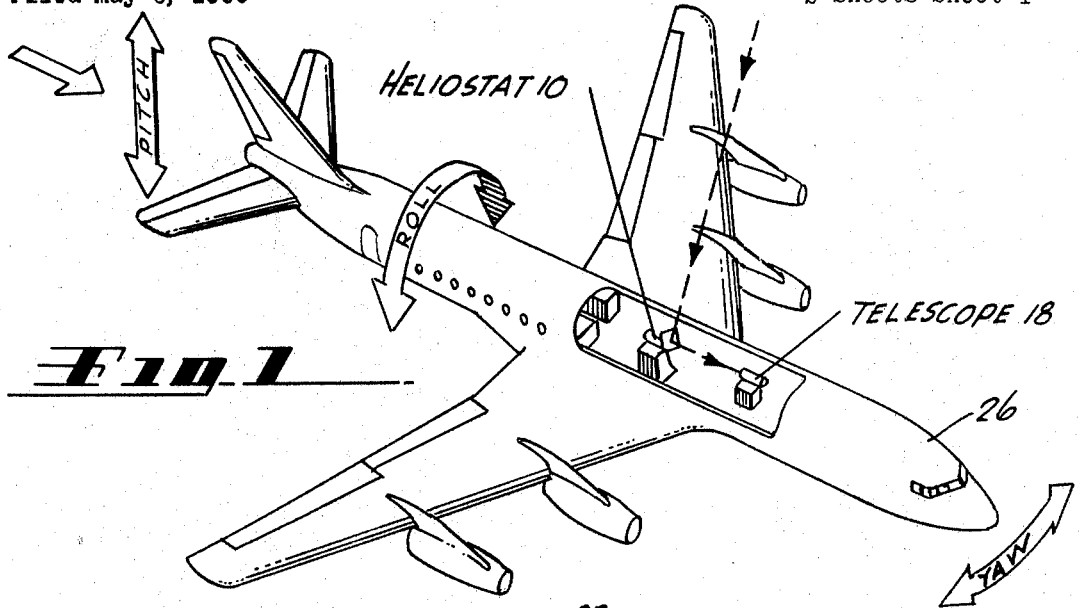
FIG. 1 is a view illustrating one use of the invention.
Figure 2:
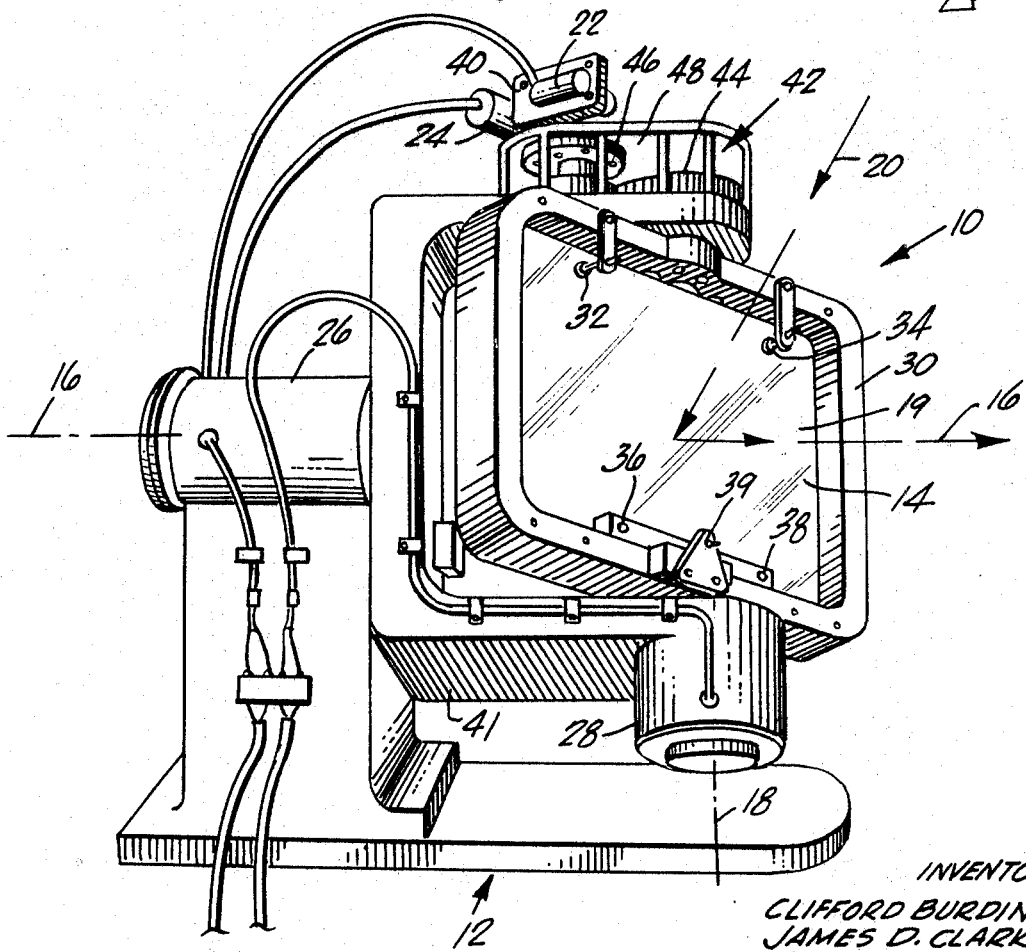
FIG. 2 is a perspective view of the gimbal mounted servo actuated reflecting surface.

FIGS. 1 and 2 depict a heliostat 10 used to negate the effects of aircraft motion on the look direction. The heliostat consists of a gimbal 12 containing a mirror 14 which is made to rotate about each of the two gimbal axes 16, 18 by means of torque motors built into the axes. One gimbal axis 16 is made coincident with the optical axis of a viewing instrument, such as a camera or telescope, for example. Rotation of the mirror 14 about this axis produces a rotation of the look direction 20 in an elevation sense. The mirror 14 is mounted so the plane of its surface is parallel to the second gimbal axis 18. Rotation of the mirror 14 about this axis 18 produces a rotation of the look direction 20 in an azimuth sense. Two single-degree-of-freedom rate integrating gyros 22, 24 are installed on the gimbal to sense angular aircraft motion about axes parallel to the gimbal axes 16, 18. When an angular motion of the aircraft 26 is sensed by either of these gyros 22, 24, the mirror 14 is caused to rotate about the associated gimbal axis by an amount required to maintain a space stabilized look direction 20.

The heliostat gimbal 12 was machined from aluminum and was assembled with direct drive DC torque motors 26, 28 integrated into the axes to provide for rotation of the mirror frame 30. The primary reason for using direct drive torque motors rather than conventional servo-motors was to eliminate the need for gear trains with their associated backlash and friction problems. The outer axis 16 of the gimbal is referred to as the elevation axis. The inner axis 18 of the gimbal is referred to as the azimuth axis. The inner or azimuth axis frame 30 was designed to accommodate mirror 14.

It was necessary for the mirror surface to be precisely aligned parallel to the azimuth axis 18. It was also necessary for the mirror 14 to be solidly supported to reduce mirror bending. For alignment a three-point suspension is ideal, whereas, a four-point suspension gives better support. The suspension arrangement derived for the mirror, as can be seen in FIG. 2, provides support for the mirror at four points, 32, 34, 36, 38, but combines two of the support points, 36, 38, into a single point 39 for adjustment ease.

The elevation gyro 22 is mounted directly on a gyro platform 40. This gyro is aligned to sense angular deviation about the elevation axis 16.

Any motion of the mirror 14 about the azimuth axis 18 causes twice that angular motion of a reflected beam of light because both the reflected angle and the reference from which it is measured, a line perpendicular to the mirror, are changed. Therefore, to reflect a beam of light in a fixed direction any motion of the aircraft 26 about the gimbal azimuth axis 18 requires but one-half that motion of the mirror 14. On the other hand, to maintain a gyro 24 in a fixed orientation, its motion relative to the aircraft 26 must be equal and opposite to that of the aircraft relative to inertial space. There is then a requirement for a 2:1 drive mechanism 42 between the mirror 14 and the azimuth gyro 24. The drive mechanism 42 uses two pulleys, the large one 44 attached to the mirror 14 and the smaller one 46 attached to a gyro platform 40 holding the gyro 24, connected by a steel band 48 to produce the required two-to-one ratio. This was the only drive mechanism found that was capable of meeting the accuracy requirements. The steel band drive mechanism introduces less than 3 arc seconds of error for a mirror motion of 1° with only standard machine tolerances required. By comparison, precision antibacklash gears could result in errors up to 4½ minutes of arc, or about 100 times greater error than the band drive mechanism, even with tooth-to-tooth errors amounting to only 1/10,000 of an inch.

The heliostatic system operates in the following way: The gyros 22, 24 provide a reference for angular displacement. When either gyro senses an angular deviation from this reference it generates an electrical signal that is proportional to the deviation or error. The electronics amplify and shape the error signal which in turn causes the associated elevation or azimuth torque motor 26 or 28 to rotate the mirror 14 until the gyro has been returned to the original reference position. A servo control system is used for each axis to provide zero steady state position error and high accuracy dynamic positioning.

Figure 3:
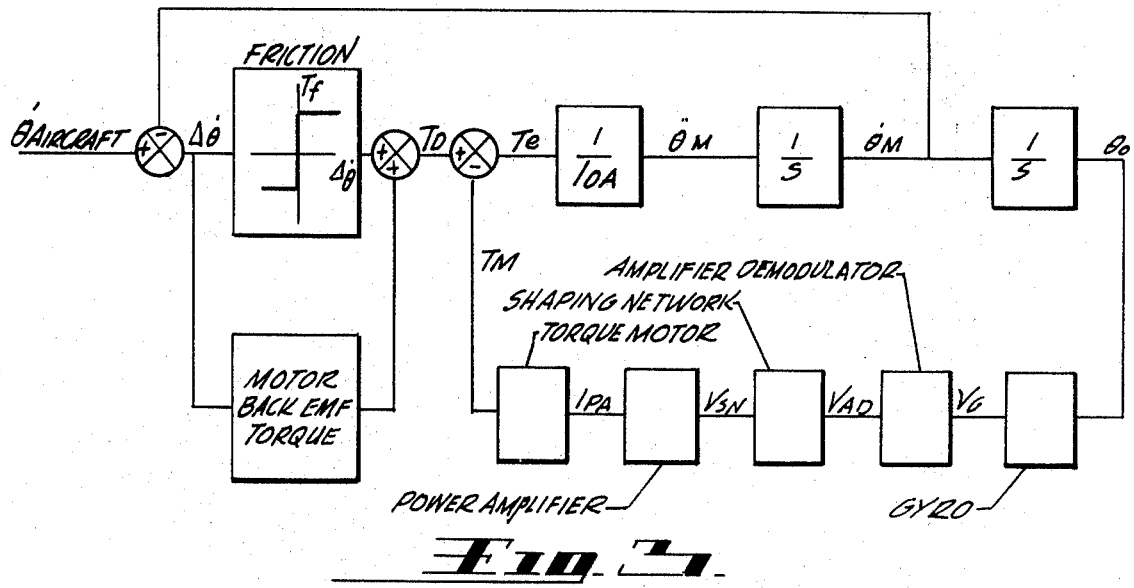
FIG. 3 is a block diagram of the elevation axis control system.
Figure 4:
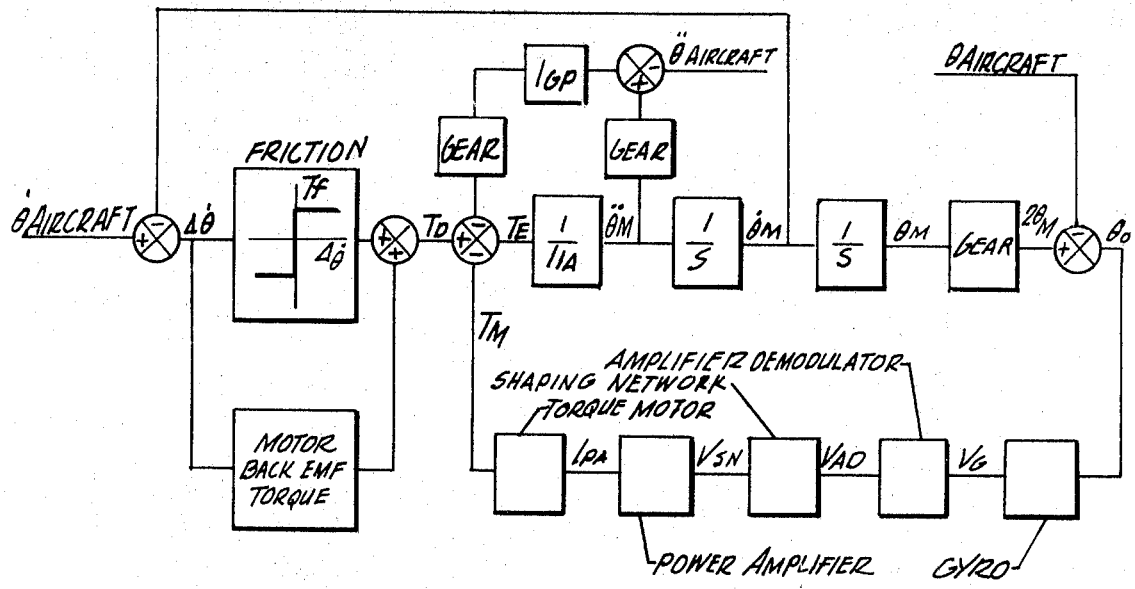
FIG. 4 is a block diagram of the azimuth axis control system.

Block diagrams of the elevation and azimuth axis control system are shown in FIGS. 3 and 4, respectively. Symbols used are identified as follows:

$\theta_0$ = Angular displacement of gyro with respect to inertial space.

$\theta_{Aircraft}$ = Angular displacement of the aircraft with respect to inertial space.

$\dot{\theta}_{Aircraft}$ = Angular rate of the aircraft with respect to inertial space.

$\ddot{\theta}_{Aircraft}$ = Angular acceleration of the aircraft with respect to inertial space.

$\theta_M$ = Angular displacement of the mirror with respect to inertial space.

$\dot{\theta}_M$ = Angular rate of the mirror with respect to inertial space.

$\ddot{\theta}_M$ = Angular acceleration of the mirror with respect to inertial space.

$\Delta\theta$ = Angular rate of the mirror with respect to the aircraft.

$I_{GP}$ = Gyro platform moment of inertia.

$I_{OA}$ = Moment of inertia about outer axis.

$I_{IA}$ = Moment of inertia about inner axis.

$S$ = Laplace operator.

$T_f$ = Frictional torque.

$T_M$ = Motor torque.

$T_D$ = Disturbing torque.

$T_E$ = Error torque.

V=Output voltage.
i=Output current.
Subscripts:
  AD=Amplifier demodulator.
  G=Gyro.
  PA=Power amplifier.
  SN=Shaping network.

The cross coupling effects due to axis non-orthogonality, gyro misalignment, and mass unbalance are not shown on the diagrams. The meticulous care that was exercised during manufacture and assembly ensured that the system errors produced by these effects would be negligible. With these effects eliminated from the block diagrams it may be noted from FIG. 3 that the only coupling remaining between the heliostat elevation axis and the aircraft is motor back EMF and friction. The block diagram in FIG. 4 of the azimuth axis differs from the elevation axis block diagram in FIG. 3 because of the 2:1 drive ratio between the azimuth gyro and the mirror. As previously indicated, the mirror is required to be inertially stabilized about the elevation axis but must be rotated in inertial space about the azimuth axis. This accounts for the difference in the block diagrams. For linear stability analysis the block diagram in FIG. 4 for the azimuth axis can be reduced by block diagram algebra to the same form as that of the elevation axis in FIG. 3. The two would then differ by only a gain factor caused by the different values of inertial loads and gearing mechanical gain.

The primary coupling between the aircraft and the elevation axis is friction. The frictional torque is reasonably constant with frequency. Referring to FIG. 3 it can be seen, then, that the input to the system is essentially a constant amplitude square wave of torque, $T_D$. Even with no feedback or correcting torque, $T_M$, the error, $\theta_o$, would decrease with increasing frequency of the input torque. Still considering FIG. 3, $\dot{\theta}_M$ would be a constant amplitude square wave and $\theta_o$ would be the double integral of this, or a parabolic wave whose amplitude would be proportional to $1/f^2$ times the peak amplitude of $\dot{\theta}_M$. $\theta_o$ thus decreases with input frequency and this is the autostabilization effect. For very low frequencies the autostabilization effect is negligible and the reduction of the error is due entirely to the servo system. At some low frequency the detrimental effect of increasing frequency on the servo response is nearly compensated by the beneficial effect of autostabilization and the error remains constant for a narrow bandwidth.

The error of the azimuth axis continues to increase with frequency. This is because the azimuth axis frame must be rotated in inertial space. The azimuth gyro is inertially stabilized, but the azimuth axis frame and mirror are not because of the 2:1 drive ratio between gyro and mirror. The autostabilization effect is now detrimental to the operation of the system. Referring to FIG. 4, notice that $\theta_M$ now tends to zero because of autostabilization as frequency is increased, but it is desired that $\theta_o$ remain zero. For $\theta_o$ to be zero, $\theta_M$ must equal ½$\theta$ aircraft. The error therefore continues to increase with increasing frequency due to the response time of the servo loop and the detrimental effect of autostabilization.

There are numerous advantages that image stabilization by means of a heliostat offers over inertially stabilizing a complete experimental package. For one, the performance of a heliostat is not affected by changes in the experimental equipment nor does the experimental equipment have to be operated "hands off" as it would if inertially stabilized. For another, a heliostat because of its compact size, is very suited for use on experiments which require viewing out of an airplane window at greatly different elevation angles. By comparison, the rotational axis of a gimbal which holds an inertially stabilized telescope would generally have to be such a distance from the window for proper balance, that the viewing angle would be severely restricted. Probably the most significant advantage of a heliostat is the ease with which it can be adapted for use on different experiments.

Having thus described the invention, it is believed that other modifications and variations will readily become apparent to one skilled in the art, and that such deviations from the described embodiment are to be considered as part of the invention.

What is claimed is:
1. A heliostat for stabilizing the look direction in space of a telescope mounted on a base in an aircraft subject to motion, said telescope having an optical axis and a look direction,
   a reflecting surface on said optical axis for reflecting the image of a selected object along said axis toward said telescope,
   moving means for rotating and pivoting the plane of said reflecting surface to compensate for elevational and azimuth movement of said base, said means including a gimbal having an outer axis coincident with the optical axis of said telescope for elevational movement, said gimbal having an inner axis transverse to said outer axis for azimuth movement of said reflecting surface, said reflecting surface being on said inner axis,
   said reflecting surface having a larger pulley attached thereto to rotate said reflecting surface,
   said azimuth gyro having a smaller pulley attached thereto and rotated by said azimuth gyro,
   said pulleys being connected to move said reflective surface one-half the angle of deviation in azimuth from a predetermined reference caused by motion of said base,
   said moving means including integrating-rate gyros and direct drive DC torque motors,
   said gyros establishing a fixed reference in space and sensing rotation of said reflecting surface about said axes by developing error signals when said gyros are moved from said reference by motion of said base,
   said motors being integrated into said axes and energized from said error signals to move said gyros back to said reference and thus hold constant the look direction of said telescope in space by moving the plane of said reflecting surface to reflect the image of said selected object along the optical axis of said telescope.

References Cited

UNITED STATES PATENTS

| | | |
|---|---|---|
| 1,688,559 | 10/1928 | Sperry. |
| 2,505,819 | 5/1950 | Wrigley. |
| 2,914,763 | 11/1959 | Greenwood et al. |
| 2,949,030 | 8/1960 | Horsfall et al. ___ 356—248 X |

FOREIGN PATENTS 408,738   1/1945   Italy.

RONALD L. WIBERT, Primary Examiner

T. MAJOR, Assistant Examiner

U.S. Cl. X.R.

33—61